April 1, 1930.  T. C. STRAWN  1,752,467
GARDEN IMPLEMENT
Filed Oct. 3, 1927
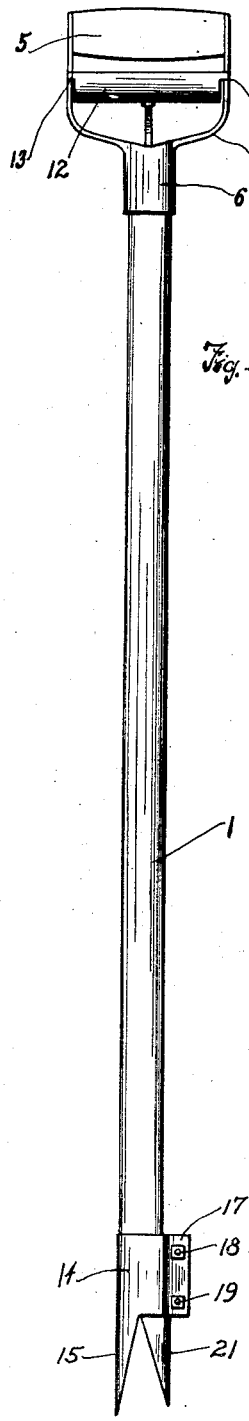
Fig. 1
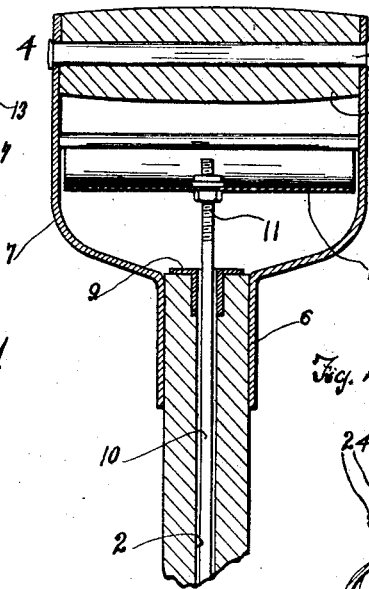
Fig. 2
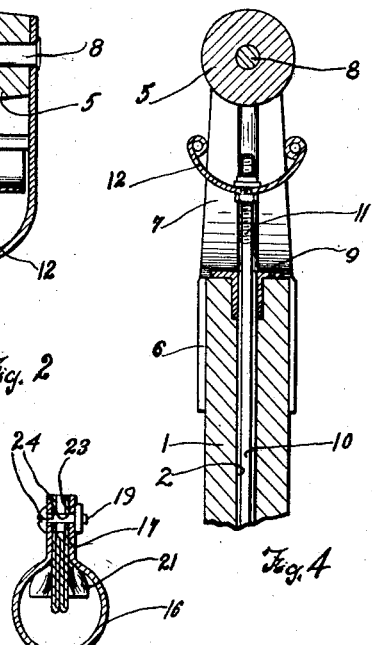
Fig. 4
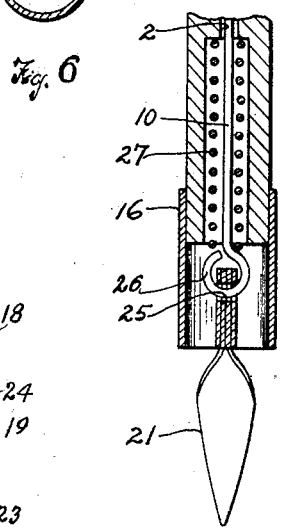
Fig. 6
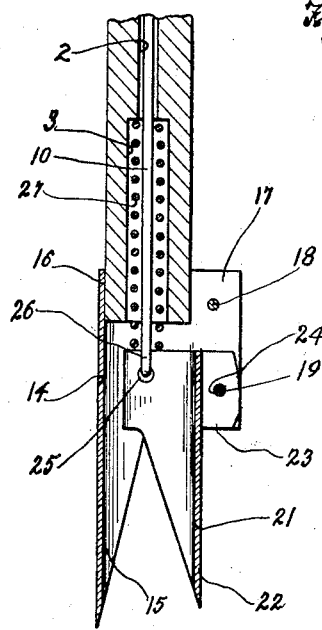
Fig. 5
Fig. 3
INVENTOR.
Thomas C. Strawn
BY
Fay, Oberlin & Fay
ATTORNEYS.

Patented Apr. 1, 1930

1,752,467

UNITED STATES PATENT OFFICE

THOMAS C. STRAWN, OF SALEM, OHIO

GARDEN IMPLEMENT

Application filed October 3, 1927. Serial No. 223,525.

This invention as indicated relates to a garden implement. More particularly it comprises an implement which is adaptable for handling of plants and may be used as a weed pulling implement or as a means of setting out plants such as cabbage and tomato plants and various flowers. The principal object of the invention is to provide an improved implement of the type indicated which will permit the user to handle plants without stooping to an uncomfortable position and to accomplish more work in a garden in a limited time than can be accomplished by means of the usual implements which require a kneeling posture to carry on the work. Other and further objects of the invention will appear in the course of the following description. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a side elevation of an implement embodying the features of my invention; Figs. 2 and 3 are central vertical sectional views of the upper and lower portions respectively of the device shown in Fig. 1; Figs. 4 and 5 are views similar to 2 and 3 taken at right angles to the position shown in Figs. 1 to 3; and Fig. 6 is a horizontal sectional view in the plane of the pivot pin for the movable jaw.

In the form of the invention illustrated, the staff 1 is preferably formed of wood and provided with central bore 2 communicating with a countersunk recess 3 adjacent its lower end to serve as a spring housing as will be presently explained. It is provided at its upper end with a shovel type handle 4 having a wooden grip section 5 and a support preferably formed of stamped sheet metal and providing a tubular shank 6 adapted to be firmly secured to the upper end of the staff, and a pair of upwardly extending side members 7, through the upper ends of which the ends of the pin 8, supporting the grip section 5, engage. A metal ferrule 9 is preferably engaged with the upper end of the staff to form a guide for an operating rod 10 which is adapted to be engaged within the central bore of said staff. The upper end 11 of said operating rod is preferably screw-threaded and engaged through a central aperture in a movable grip member 12 positioned parallel to the grip section 5. The movable grip member preferably is formed of sheet metal bent to semi-cylindrical form with its concave portion disposed toward the grip section 5. The ends of said member are preferably of somewhat greater length than the body portion thereof and comprise marginal portions folded over metal bars to make the same more rigid. These projecting end portions 13 of the removable grip member serve as guides by coacting with the marginal edges of the metal side portions 6.

The lower end of the staff is provided with a stationary scoop-like jaw member 14 having a pointed lower portion 15 and a sleeve-like upper portion 16, said upper portion terminating in a pair of rearwardly extending flanges 17 and forming an integral split collar. Said flanges are each perforated at two points to receive clamping bolts 18 and 19. The lower clamping bolt 19 serves not only the function of clamping the sleeve upon the staff, but also acts as a pivot pin for a movable jaw 21.

The movable jaw as is more clearly shown in Fig. 5 of the drawing, is preferably formed of a section of sheet metal folded to substantially semi-spherical shape adjacent its lower end and shaped to provide a sharpened scoop-like terminal 22 and formed with a flattened extension at its upper end, being provided with elongated tongues 23 adjacent its upper end folded reversely upon the flattened portion of said member. Said tongues project rearwardly of the body portion of said member and are provided with a central aperture 24 adapted to be engaged over the clamping bolt 19. The flattened body portion adjacent its opposite end is provided with an aperture 25 substantially in alignment with the central bore of the staff and the lower end 26 of the operating rod 10 is adapted to be formed into a loop engaged through said opening 25. A coiled spring 27 is housed within the recess 3 heretofore described with its lower end bearing against the upper edge of the movable jaw member.

From the description of the construction of the device, it will be obvious that when the movable gripping member is engaged by the fingers of the user, and moved toward the upper gripping member, that the rod will be drawn upwardly against the pressure of the coiled spring and the removable jaw will be forced toward the stationary jaw at the lower end of the staff. The pull of the rod upon the movable jaw is direct inasmuch as the power is applied to the angle portion thereof in alignment with the central bore of the staff, the pivot pin being displaced outwardly from said point of attachment of the rod which provides for a greater leverage upon the movable jaw than where such pivot is not so positioned.

Accordingly ample gripping force can be easily applied to engage the body of a weed at a point slightly beneath the surface of the ground and the entire weed may be removed from the garden, without much effort. Should it be desired to use the implement as a planting device, the plant may be engaged within the jaws and the plant set in position. The jaws are then released and the earth is pressed about the plant at the point of insertion of the same by pressure of the foot of the operator.

The implement as has been indicated may be very cheaply constructed inasmuch as the principal metal parts are simple stampings and may be readily assembled upon the wooden staff. The drilling of the staff with the central bore and the counter-bored section thereof may be accomplished at a single operation.

The shaping of the stamped metal parts not only adapts the same for the uses indicated, but increases the strength of said parts by virtue of their special shape.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A garden implement comprising a tubular staff, a member formed of sheet metal providing a scoop-like jaw at its lower end, and an integral split collar with parallel flanges at its upper end, said flanges having aligned bolt holes, a plurality of bolts engaged through said flanges for clamping said collar about the lower end of said staff, a movable jaw member having a scoop-like shape at its lower end and having a flattened extension at its upper end received freely between said flanges and pivotally mounted on the lower of said bolts, a coil spring abutting the lower end of said staff and the upper portion of said movable jaw, and normally pressing said movable jaw outwardly, and an operating rod within said staff and passing through said spring and engaging directly with the flattened portion of said movable jaw opposite the pivot end thereof.

2. A garden implement comprising a tubular staff having a fixed and movable jaw each formed of sheet metal and being of scoop-shape for either plant removal or plant inserting purposes, said fixed jaw being formed with an integral split collar having parallel flanges adjacent its upper ends, bolts through said flanges to clamp the same to said staff, said movable jaw having an extension formed of integral sheet metal tongues in flat folded position adjacent its upper end, one end of said extension being freely received between said flanges of said fixed jaw and pivotally mounted on one of the securing bolts therefor, and the other end of said extension being directly engaged by an operating rod positioned centrally within said staff and extending to the upper end thereof.

Signed by me this 27th day of September, 1927.

THOMAS C. STRAWN.